United States Patent
Vassoff

[19]

[11] Patent Number: 5,908,339
[45] Date of Patent: Jun. 1, 1999

[54] MODULAR GAS-DRIVEN POWER DISTRIBUTION SYSTEM

[76] Inventor: Matthew A. Vassoff, 313 Railroad St., Chelsea, Mich. 48118

[21] Appl. No.: 09/138,475

[22] Filed: Aug. 21, 1998

Related U.S. Application Data

[60] Provisional application No. 60/056,194, Aug. 21, 1997.

[51] Int. Cl.$^6$ .................................................... B63H 21/26
[52] U.S. Cl. .............................. 440/101; 440/49; 440/113
[58] Field of Search ..................... 30/122, 500; 440/101, 440/62, 28, 900, 53

[56] References Cited

U.S. PATENT DOCUMENTS

| | | | |
|---|---|---|---|
| 827,202 | 7/1906 | Bachman | 440/101 |
| 1,512,391 | 10/1924 | Abraham | 440/101 |
| 3,498,253 | 3/1970 | Wood, Jr. | 440/101 |
| 3,977,078 | 8/1976 | Pittinger, Jr. | 30/276 |
| 4,752,256 | 6/1988 | Dorian | 440/49 |

*Primary Examiner*—Ed L. Swinehart
*Attorney, Agent, or Firm*—Gifford, Krass, Groh, Sprinkle, Anderson & Citkowski, PC

[57] ABSTRACT

A modular, gas-driven power distribution system includes a gasoline-operated module delivering power to a connector having a rotatable element enabling a plurality of mechanical devices to be detachably coupled to the connector to receive power through the rotatable element. The plurality of connectable devices includes a powered oar adapted for nautical purposes. The oar preferably comprises a shaft having a proximal end adapted for detachable coupling to the connector forming part of the gasoline-operated module, and a distal end transitioning into a paddle shape terminating in a rotating prop. A rotatable axle is disposed centrally within the shaft, the axle having a proximal end adapted for detachable coupling to the rotatable element to deliver power to the rotating prop. In addition to the powered oar embodiment, the invention preferably also facilitates interconnection to a reciprocating saw and electrical generator, each having a motive power receiving end adapted for detachable coupling to the rotatable element of the gasoline-operated module.

9 Claims, 3 Drawing Sheets

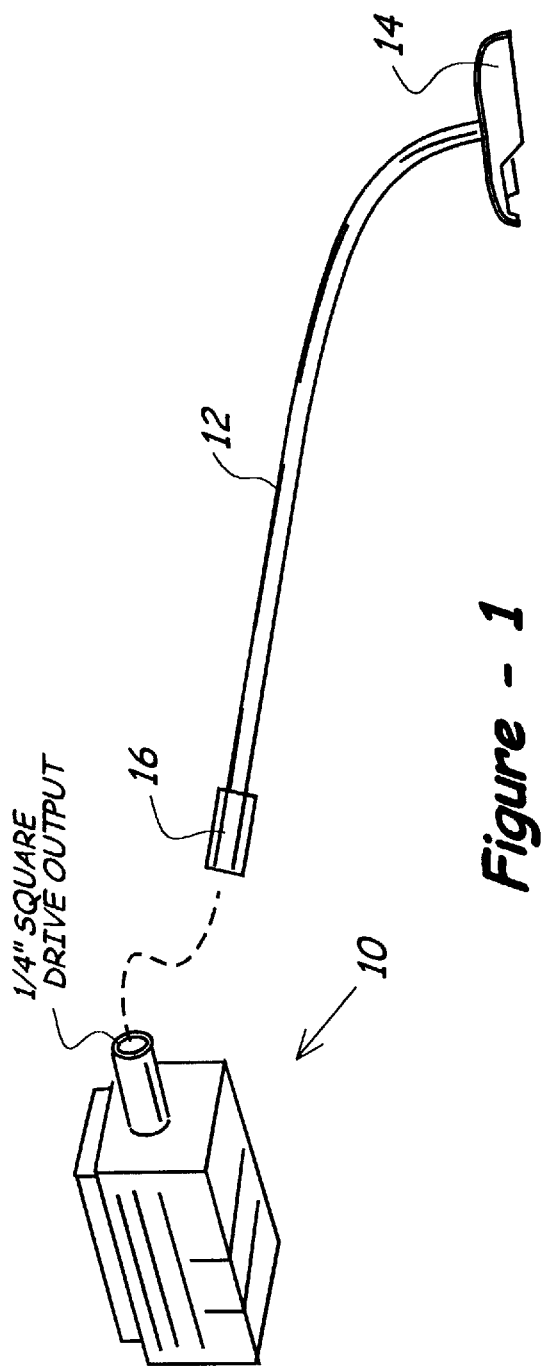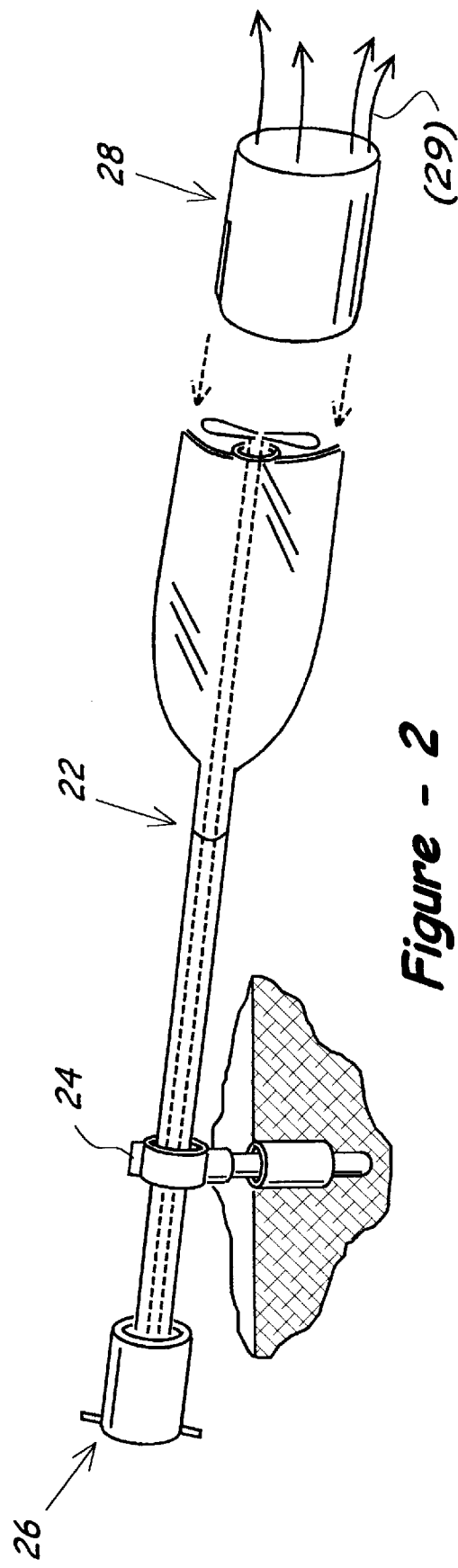

MODULAR GAS-DRIVEN POWER DISTRIBUTION SYSTEM

REFERENCE TO RELATED APPLICATIONS

This application claims priority of U.S. Provisional Patent Application Ser. No. 60/056,194, filed Aug. 21, 1997, the entire contents of which are incorporated herein by reference.

FIELD OF THE INVENTION

This inventor relates generally to gasoline-powered implements and, in particular, to a modular power distribution system wherein a gasoline-fueled powerpack may be selectively coupled to a variety of tools and accessories, including a powered boat useful for trolling and other purposes.

BACKGROUND OF THE INVENTION

It has been found that the small, two-cycle gasoline engines found on weed-mowing equipment may be utilized for other purposes. In particular, it is noted that many commercially available weed mowers of this kind, which are sold under trade names such as WeedEater® or WeedWhip®, feature a coupling between the tube which delivers power to the rotating head and the powerpack which is of a standard configuration, including a recessed quarter square drive.

The power delivery module may be made available for other applications by disengaging the power-delivery tube from the gas-driven powerpack and connecting one of a variety of mechanically operable accessories to the standard coupling. In particular, the weed-trimming shaft assembly may be replaced with a devices such as an electrical generator, reciprocating saw, or powered oar in accordance with the teachings of the instant invention. Although a power pack for boats has been described in U.S. Pat. No. 3,498,253, this unit is electrically powered, and the drive mechanism is integral to the drive shaft, thereby preventing disassembly for other applications. In addition, the drive shaft is substantially rigid, thereby precluding a slight flex which has been found to be advantageous in relation to strong water currents.

SUMMARY OF THE INVENTION

This invention takes advantage of the disengageable coupling found on existing gas-driven powerpacks, by providing a variety of attachments which may be easily connected and disconnected from these relatively inexpensive gas engine powerpacks. The invention specifically resides in a modular, gas-driven power distribution system including a gasoline-operated module delivering power to a connector having a rotatable element, thereby enabling a plurality of mechanical devices to be detachably coupled to the connector to receive power through the rotatable element, including a powered oar adapted for nautical purposes.

In a preferred embodiment, the oar further comprises a shaft having a proximal end adapted for detachable coupling to the connector forming part of the gasoline-operated module, and a distal end transitioning into a paddle shape terminating in a rotating prop. A rotatable axle is disposed centrally within the shaft, the axle having a proximal end adapted for detachable coupling to the rotatable element to deliver power to the rotating prop. The combination of the shaft and centrally disposed axle is preferably at least partially flexible using, for example, a coiled drive cable.

The gasoline-operated module may either be rigidly affixed to the proximal end of the powered oar, such that the module moves in cooperation with the oar when the oar is moved, or, alternatively, the gasoline-operated module may be adapted for fixation to a nautical vessel, wherein the system would preferably further include a rotatably flexible cable interconnecting the module connector to the proximal end of the powered oar.

In addition to the powered oar embodiment, the invention preferably also facilitates interconnection to a reciprocating saw and electrical generator, each having a motive power receiving end adapted for detachable coupling to the rotatable element of the gasoline-operated module.

BRIEF DESCRIPTION OF THE DRAWINGS

FIG. 1 illustrates, from an oblique perspective, a simplified rendering of a weed trimmer power unit and drive tube which may detached and utilized for various purposes according to the invention;

FIG. 2 illustrates a powered paddle for nautical use according to the invention;

DETAILED DESCRIPTION OF THE INVENTION

Figure 3:
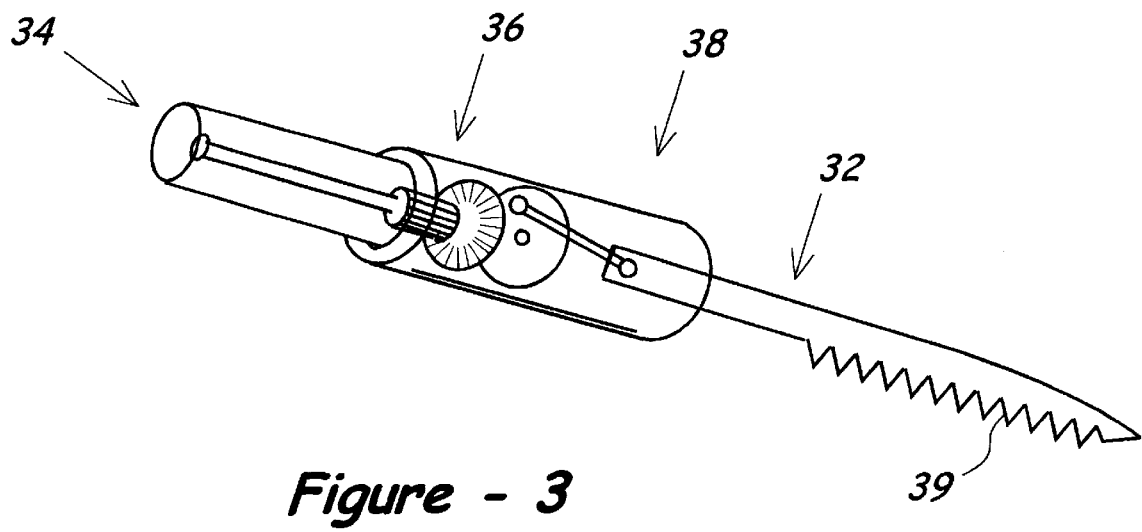
FIG. 3 illustrates a reciprocating saw which may be accommodated according to the invention.

FIG. 1 illustrates, in simplified form, the way in which a powerpack 10 of the type ordinarily supplied with weed-trimming units may be detached from its drive 12 to which there connects a weed-trimming head 14, and utilized for alternative configurations according to this invention. Typically these power units 10 are of the air-cooled, two-stroke variety, and in the range of 40–50 cc, though clearly other detachable configurations may be accommodated, according to the principles disclosed herein.

Typically these power units 10 decouple from their drive tubes 12 through a coupling 16, and wherein there exists recessed into a mating component a one-quarter square drive output associated with power transfer from the powerpack 10 to the working assembly. According to this invention, decoupling is preferably carried out at this point, thereby revealing and making available this drive output for other purposes.

FIG. 2 illustrates one such purpose according to the invention, ion this case, a powered paddle or oar 22, which may either be lightweight and portable, or, if sufficiently heavy, preferably attachable through a swivel connection 24 to the vessel or craft. The power unit 10 of FIG. 1 connects at the end 26 of the powered paddle, delivering rotational energy to a prop 28 located at its distal end. The shaft of the oar 22 is preferably of a hollow metal construction, as might be found with modern aluminum oars, and the drive shaft internal to this outer casing may either be rigid or flexible.

In the preferred embodiment, the cable-carrying shaft of the powered oar is at least partially flexible to protect against breakage in the event of strong water currents attempting to exert a bending moment on the assembly. In this case, in addition to relatively thin-walled aluminum or other metals, the outer housing of the shaft may be constructed of fiberglass of other flexible, light materials. In addition, the axle used from the end 26 to the prop 28 may be sufficiently thin in cross section to permit flexing or, as described below, may take the form of a flexible, coiled cable. In the preferred embodiment a shroud 28 is added to minimize injury and direct water flow 29 therethrough.

FIG. 3 illustrates yet a further alternative embodiment according to the invention wherein a reciprocating saw 32 connects to the powerpack 10 at an end 34. Preferably, a drive shaft entering into the unit from end 34 engages with a set of 45° beveled heli-cut hardened gears 36 which them, in turn, attach to a reciprocating unit 38 driving the blade 39 at the distal tip. Although the connection at end 34 may be made directly to the powerpack 10, preferably, in this embodiment to save on weight, a flexible drive cable 42 may alternative be utilized.

Figure 4:
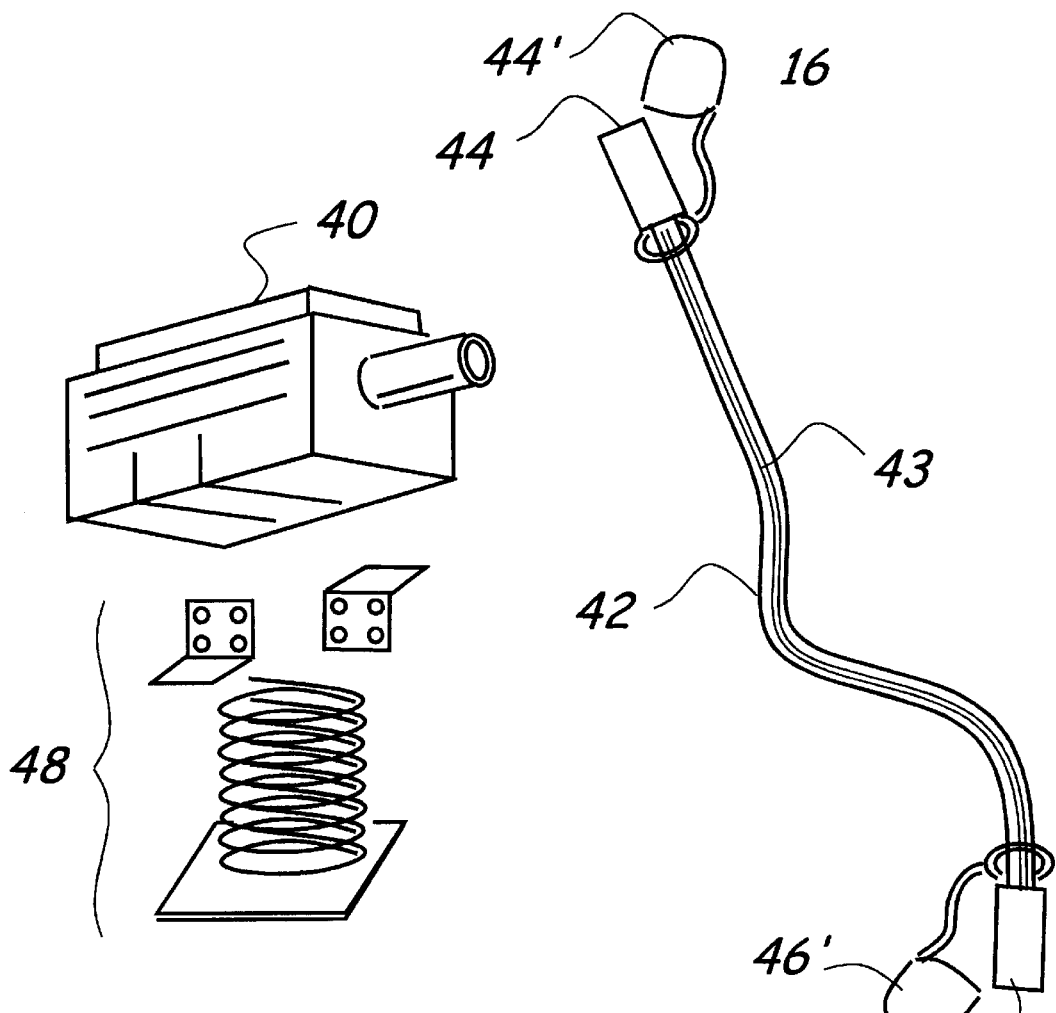
FIG. 4 illustrates various components, according to the invention, which may be utilized in conjunction with a detachable power unit located physically remotely from an appliance powered according to the invention.

Making reference to FIG. 4, this cable 42, which is preferably in the range of 48–60 inches in length, includes a molded quick connect connector at one end to attach to a unit to be powered, and an attachment end 46 at the other end adapted for attachment to a power unit 40. Rubber caps 44' and 46' may be added, for example, to resist the effects of weather or moisture.

The flexible cable 42 just described may be utilized with any of the appliances just described, or others which might be desirable, including the power paddle 22 of FIG. 2. Indeed, in such a case, it may be advantageous to connect the flexible cable to the end 26, and locate the powerpack 40 elsewhere in a user's boat, in which case it may be desirable to locate the powerpack 40 within a sound-absorbing box which, in turn, may use a mount system 48 to control vibrational energy. Such a mount system might include a ball/flex freedom engineering type mount and may further incorporate a suction attachment for making connection to a boat surface. Such a suction attachment may include a bleed nipple, for more straightforward removal.

Figure 5:
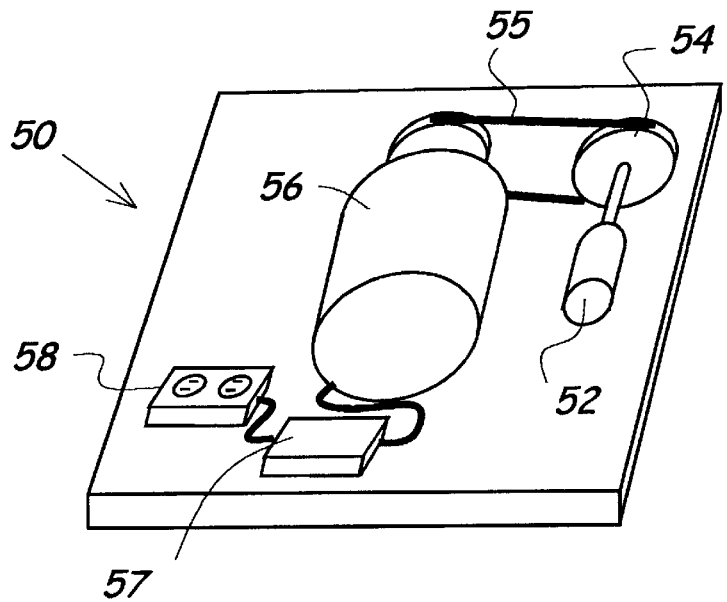
FIG. 5 illustrates yet a further alternative embodiment wherein the drive unit according to the invention powers a portable generator.

Now making reference to FIG. 5, there is shown, from an oblique perspective, yet a further alternative embodiment of the invention wherein a power unit detached from a weed mowing device may be connected to a portable generator unit 50, in which case power in the range of 300–500 watts, or thereabouts, may be made available through the same power unit used to drive the other appliances described above. As yet a further alternative embodiment, the power drive may be attached to a water pump or other type of pumping apparatus, which would appear similar to that shown in FIG. 5, though obviously with entirely different functionality.

I claim:

1. A modular, gas-driven power distribution system, comprising:
   a gasoline-operated module delivering power to a connector having a rotatable element, thereby enabling a plurality of mechanical devices to be detachably coupled to the connector to receive power through the rotatable element, such mechanical devices including:
   a powered oar adapted for nautical purposes, the oar including a shaft having a proximal end adapted for detachable coupling to the connector forming part of the gasoline-operated module, and a distal end transitioning into a paddle shape terminating in a rotating prop, and a rotatable axle disposed centrally within the shaft, the axle having a proximal end adapted for detachable coupling to the rotatable element to deliver power to the rotating prop.

2. The modular, gas-driven power distribution system of claim 1, wherein the combination of the shaft and centrally disposed axle is at least partially flexible.

3. The modular, gas-driven power distribution system of claim 2, wherein the axle is a flexible cable.

4. The modular, gas-driven power distribution system of claim 3, wherein the flexible cable is coiled.

5. The modular, gas-driven power distribution system of claim 1, wherein the rotatable element includes a square-shaped fitting.

6. The modular, gas-driven power distribution system of claim 1, wherein the plurality of mechanical devices includes a reciprocating saw having a motive power receiving end adapted for detachable coupling to the rotatable element of the gasoline-operated module.

7. The modular, gas-driven power distribution system of claim 1, wherein the plurality of mechanical devices includes an electrical generator having a motive power receiving end adapted for detachable coupling to the rotatable element of the gasoline-operated module.

8. The modular, gas-driven power distribution system of claim 1, wherein the gasoline-operated module is rigidly affixed to the proximal end of the powered oar, such that the module moves in cooperation with the oar when the oar is moved.

9. The modular, gas-driven power distribution system of claim 1, wherein the gasoline-operated module is adapted for fixation to a nautical vessel, the system further including a rotatably flexible cable interconnecting the module connector to the proximal end of the powered oar.

\* \* \* \* \*